United States Patent [19]
Johnson

[11] Patent Number: 5,367,691
[45] Date of Patent: Nov. 22, 1994

[54] PIPE-STAGGERED APPARATUS AND METHOD UTILIZING CARRY LOOK-AHEAD SIGNAL PROCESSING

[75] Inventor: Mark J. Johnson, Algonquin, Ill.

[73] Assignee: Motorola, Inc., Schaumburg, Ill.

[21] Appl. No.: 685,366

[22] Filed: Apr. 15, 1991

[51] Int. Cl.$^5$ .......................... G06F 7/02; G06F 7/38; G06F 7/42; G06F 9/38
[52] U.S. Cl. .................. 395/800; 364/238.7; 364/238.9; 364/239.4; 364/251.3; 364/258.2; 364/258.4; 364/259.6; 364/259.5; 364/263.1; 364/263.3; 364/258.1; 364/271.4; 364/784; 364/736; 364/DIG. 1; 364/DIG. 2
[58] Field of Search .............. 395/800, 250, 550, 500, 395/275, 325, 375, 775, 400, 270, 425, 575; 364/DIG. 1, DIG. 2, 784, 736, 732, 733, 754, 724.01, 783

[56] References Cited

U.S. PATENT DOCUMENTS

| | | | |
|---|---|---|---|
| 4,567,386 | 1/1986 | Benschop | 307/481 |
| 4,611,305 | 9/1986 | Ingel | 364/736 |
| 4,789,958 | 12/1988 | Maejima et al. | 364/787 |
| 4,862,402 | 8/1989 | Shah et al. | 364/724.12 |
| 4,866,653 | 9/1989 | Kulisch et al. | 364/748 |
| 4,887,233 | 12/1989 | Cash et al. | 364/757 |
| 4,907,187 | 3/1990 | Terada et al. | 395/375 |
| 4,999,804 | 3/1991 | Nukiyama | 364/784 |
| 5,166,642 | 11/1992 | Hietala | 331/1 A |

Primary Examiner—Alyssa H. Bowler
Assistant Examiner—Daniel H. Pan
Attorney, Agent, or Firm—Darleen J. Stockley

[57] ABSTRACT

An apparatus (100, 200) and method (300, 400) include an improved architecture for data processing that maintains data throughput while maintaining a reasonable circuit complexity. The method utilizes a system of calculating subsets of desired results that are independent of results of subsets not yet calculated, while providing a system of storage for data yet to be used and previously calculated results.

9 Claims, 2 Drawing Sheets

PIPE-STAGGERED APPARATUS AND METHOD UTILIZING CARRY LOOK-AHEAD SIGNAL PROCESSING

FIELD OF THE INVENTION

This invention relates generally to data processors, particularly to integrator and differentiator circuits.

BACKGROUND OF THE INVENTION

Many signal processing designs require hardware arithmetic support in the form of dedicated adders, subtracters, and multipliers. These operations generally have to be completed in a specified amount of time and with a minimum of circuitry. Typically, these operations require operands and/or results of several digits (bits, in a binary structure) arranged in monotonically increasing orders of magnitude. A need for such circuits has grown in response to demands of digital signal processing and complex analog-to-digital and digital-to-analog converters. As system requirements become more stringent, the number of digits required for an operation increases accordingly.

There are two standard forms of adders. One is the ripple-carry adder, in which each stage provides a carry bit or digit to the following stage. Thus, each digit of the result is dependent on the results of a computation performed on a lower adjacent digit. In this structure, the Nth digit cannot be calculated until the (N—1)th operation is completed. While this is a very space-efficient approach, with the size of the structure increasing linearly with the number of digits required, the speed at which the calculation can be performed is limited by this restriction and is often unacceptable in high-speed systems with wide data paths. The other standard form is the carry look-ahead adder, which bases its calculation for each digit not on outputs of the previous stages, but on inputs to previous stages. In this type of structure speed is enhanced, since each stage of the adder can perform its calculations simultaneously, without waiting for previous stages to complete; however, each successive stage requires approximately twice the circuitry of that preceding it. The complexity of the structure thus grows exponentially with the number of bits or digits in the data path, and is often unwieldy or completely impractical for large data paths. Further, technological restrictions on gate widths often force a compromise on higher-order stages, limiting operational speed.

It is not uncommon for the above two standard adder forms to be combined into a partial look-ahead adder comprised of N ripple-carry stages of M digits each, the M digits being organized into a traditional look-ahead structure. This has neither the speed of a full look-ahead implementation, nor the space efficiency of a ripple-carry structure, but represents a trade-off between the two.

There is a need for an accumulation apparatus that is more efficient than the combination of the two standard forms, and that simultaneously maintains a relatively low level of hardware complexity.

SUMMARY OF THE INVENTION

A data processing apparatus and method for processing input data, are included, comprising at least: a plurality of first latching unit coupled in a cascade fashion for data flow from selected first latching unit to further selected pre-stage latching unit, where desired, then to data processors (DP) having: first outputs that feedback to selected pre-stage, third latching means, second outputs that are provided to second latching unit for carry, and third outputs for data flow, wherein the second latching means are coupled between selected data processing unit for allowing selected feedforward of data and wherein the pre-stage third latching unit coupled between selected data processing unit and selected pre-stage latching unit for storing selected data processing unit feedback outputs for utilization in subsequent data processing; data processing unit coupled between preselected post-stage latching unit, where desired, and pre-stage latching unit for performing a predetermined data processing operation; and combing unit coupled to selected post-stage latching unit for determining an output for a cumulative data processing operation.

The cumulative data processing operation is one of: integration, and differentiation. Input data are typically parceled into consecutive preselected digit lengths prior to latching. Latching and data processing are generally initiated by clock pulse.

DETAILED DESCRIPTION OF THE INVENTION

Figure 1:
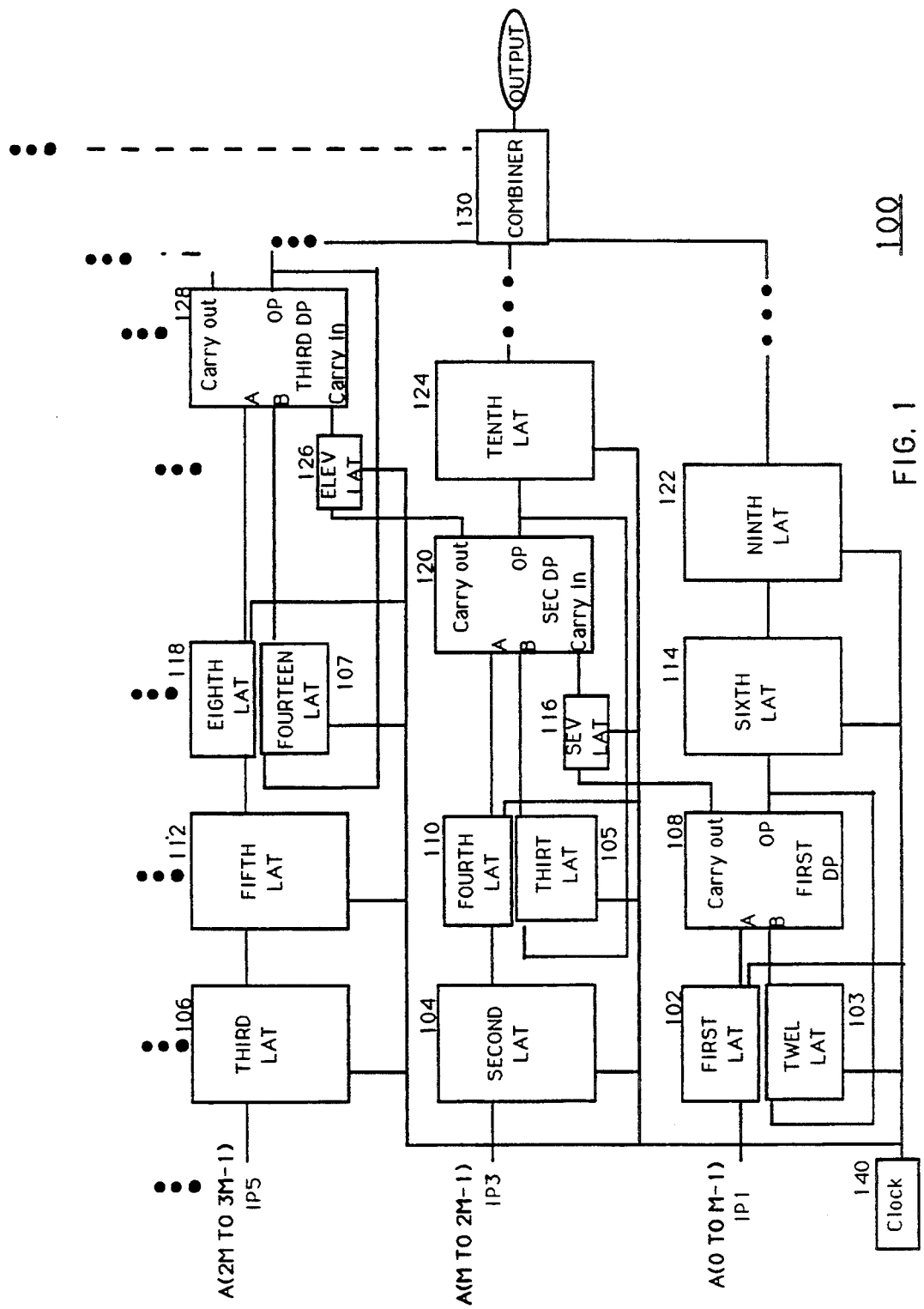
FIG. 1 is a block diagram of a first embodiment of a data processing apparatus in accordance with the present invention.

FIG. 1, numeral 100, is a block diagram of a first embodiment of a data processing apparatus in accordance with the present invention, the apparatus implementing a pipelined look-ahead accumulation format of the present invention. The data processing apparatus, 100, utilizes at least pre-stage latches (102, 104, 106, ... ) to receive input data, wherein the input data is parceled into consecutive preselected digit lengths (0 to M−1, M to 2M−1, 2M to 3M−1, ... ). In binary data processing, for example, the digit length selected is typically determined by a number of bits that can be processed in a single clock cycle.

A plurality of first latches (LAT) is coupled in a cascade fashion for data flow from each selected first latch (FIRST LAT, SECOND LAT, THIRD LAT, ... ;102, 104, 106, ... ) to further selected pre-stage latches (none, FOURTH LAT, FIFTH LAT; none, 110, 112, 118, ... ) to data processors (DP) having first outputs (FIRST DP, SEC DP, THIRD DP, ... ; 108, 120, 128, ... ) that feedback to a selected pre-stage latch (TWEL LAT, THIRT LAT, FOURTEEN LAT, ... ;103, 105, 107;, ... ), that provide second outputs to second latches (SEV LAT, ELEV LAT, ... ; 116, 126, ... ) for carry, and that provide desired data flow forward through selected post-stage latches (SIXTH LAT, NINTH LAT, ... −114 122, ... ; TENTH LAT, ... −124, . .. ). In a first cascade, a FIRST LAT (102) is coupled to a FIRST DP (108) that is coupled to a SIXTH LAT (114), the SIXTH LAT (114) being coupled to a NINTH LAT (122), continuing with coupling to further latches as desired. Further, the FIRST DP (108) is coupled to a SEV LAT (116) to provide a carry to a next data processing grouping and feeds back to a pre-stage TWEL LAT (103). Data processors (FIRST DP, SEC DP, THIRD DP, ... ; 108, 120, 128, ... ) perform a built-in designated operation, being one of: addition and subtraction.

Third latches (TWEL LAT, THIRT LAT, FOURTEEN LAT, . . . ;103, 105, 107, . . . ) are coupled between inputs and outputs of selected data processing means (FIRST DP, SEC DP, THIRD DP, . . . ; 108, 120, 128, . . . ) for storing selected data processor feedback outputs for utilization in subsequent data processing. At least a first COMBINER (130) is coupled to selected poststage latching means, including an output of a last selected data processor, for determining an output for the predetermined data processing operation. A clock (140) signal/pulse is typically utilized to initiate sequential implementation of latch and data processor functions.

Clearly a number of stages of operation, illustrated as horizontal rows of latches and at least a first data processor (DP) (a first row being latches 102, 114, 122, . . . and data processor 108) is selectable. Also, a number of groupings (102, 108, 114, 122, . . . ; 104, 110, 116, 120, 124, . . . ; 106, 112, 118, 126, 128, . . . ; . . . ), each grouping data processing a preselected digit length, is selectable by a user, typically based on a user's desired speed of data processing.

The first embodiment incorporates a pipelined look-ahead format of the present invention wherein at least a first carry-ahead latch (SEV LAT, ELEV LAT, . . . ;116, 126, . . . ) is utilized to implement a carry to the at least second data processor of a second stage of operation, thereby facilitating an integration operation. Although binary arithmetic is described in detail below, it will be apparent to one versed in the art that the concept of the present invention may be extended to other number bases.

An operand, A , representable by a number of bits, is input to an apparatus, being the first embodiment in accordance with the present invention. Consecutive M bits of A (IP1 (0 to M−1); IP3 (M to 2M−1); IP5 (2M to 3M−1); . .) are, where desired, input into a first latch (102, 104, 106, . . . ) of each first stage of operation. The first latch (FIRST LAT, FOURTH LAT, EIGHTH LAT, . . . )(102, 110, 118, . . . ) immediately prior to a data processor (FIRST DP, SEC DP, THIRD DP, . . . )(108, 120, 128, . . . ) also latches in a previous cumulative output of the data processor immediately following (FIRST DP, SEC DP, THIRD DP, . . . )(108, 120, 128, . . . ). Low order bits of both inputs are utilized by the data processor (FIRST DP, SEC DP, THIRD DP, . . .)(108, 120, 128, . . . ) to determine a low-order sum and a carry that is provided to second latches (SEV LAT, ELEV LAT, . . . )(116, 126, . . . ). It is important to note that, although the entire data processing operation has not been completed yet, the operation just described is independently determined, since it in no way depends on higher order bits of previous data processing operations. Higher order bits of the input are stored in first latches (SECOND LAT, THIRD LAT, ...)(104, 106, . . . ) for later use in accordance with the above procedure. The operand input bits are valid at the time when the CLOCK(140) strobes them into a set of first latches (FIRST LAT, SECOND IAT, THIRD LAT, . . . (102, 104, 106, . . . ). Lowest order bits of the operand stored in a first pre-stage latch (FIRST LAT)(102) are applied directly to a first data processor (FIRST DP)(108), typically an M-bit adder, while all higher bits are buffered by a further set of first latches (FOURTH IAT, FIFTH LAT, . . . )(110, 112, . . . ). At the same time, lower bits of a previous cumulative result are stored in a TWEL LAT(103) and presented to the FIRST DP(108). Latches are operated by a clock signal generated by the CLOCK (140), that defines a rate of data processing and updates the operand inputs supplied to the data processing apparatus, 100, as well as to the output.

Simultaneously, operand input bits from the SECOND LAT (104) are strobed into the FOURTH LAT (110), the previous cumulative result from the next-to-lowest order bits from SEC DP, typically an M bit adder(120), are strobed into a THIRT LAT (105), and the carry result from the operation previously performed on the lower order bits by the FIRST DP(108) is strobed into the SEV LAT(116). These data are then presented to the SEC DP(120), typically a second M bit adder, which proceeds with the determination of a next-to-lowest order bits of a next result. The first data processor (FIRST DP)(108) is simultaneously determining low-order bits of a next result. For an embodiment implementing a three grouping set of levels (THIRD LAT, FIFTH LAT, EIGHTH LAT −106, 112, 118, 128 being a last set of latches and data processor implemented), on a third clock cycle, a second data processor (SEC DP)(120) sum output is stored in the TENTH LAT (124), a corresponding result of low-order bits is transferred from the SIXTH LAT (114) to the NINTH LAT (122), and high-order bits are transferred from the FIFTH LAT (112) to the EIGHTH LAT (118). The FOURTEEN LAT (107) also stores a previous result from the third data processor (THIRD DP) (128). A carry result from the SEC DP (120) is stored in the ELEV LAT (126), and the contents of the ELEV LAT (126) and the EIGHTH LAT (118) are latched to the THIRD DP (128). At the next clock cycle, a COMBINER (130) combines, typically by summing, outputs of the THIRD DP (128), as well as outputs of the TENTH and NINTH LAT (122, 124) to obtain a desired accumulated result.

While the above text describes only integration, it will be obvious to one skilled in the art that the concepts described for integration are directly applicable to the problem of differentiation.

Figure 2:
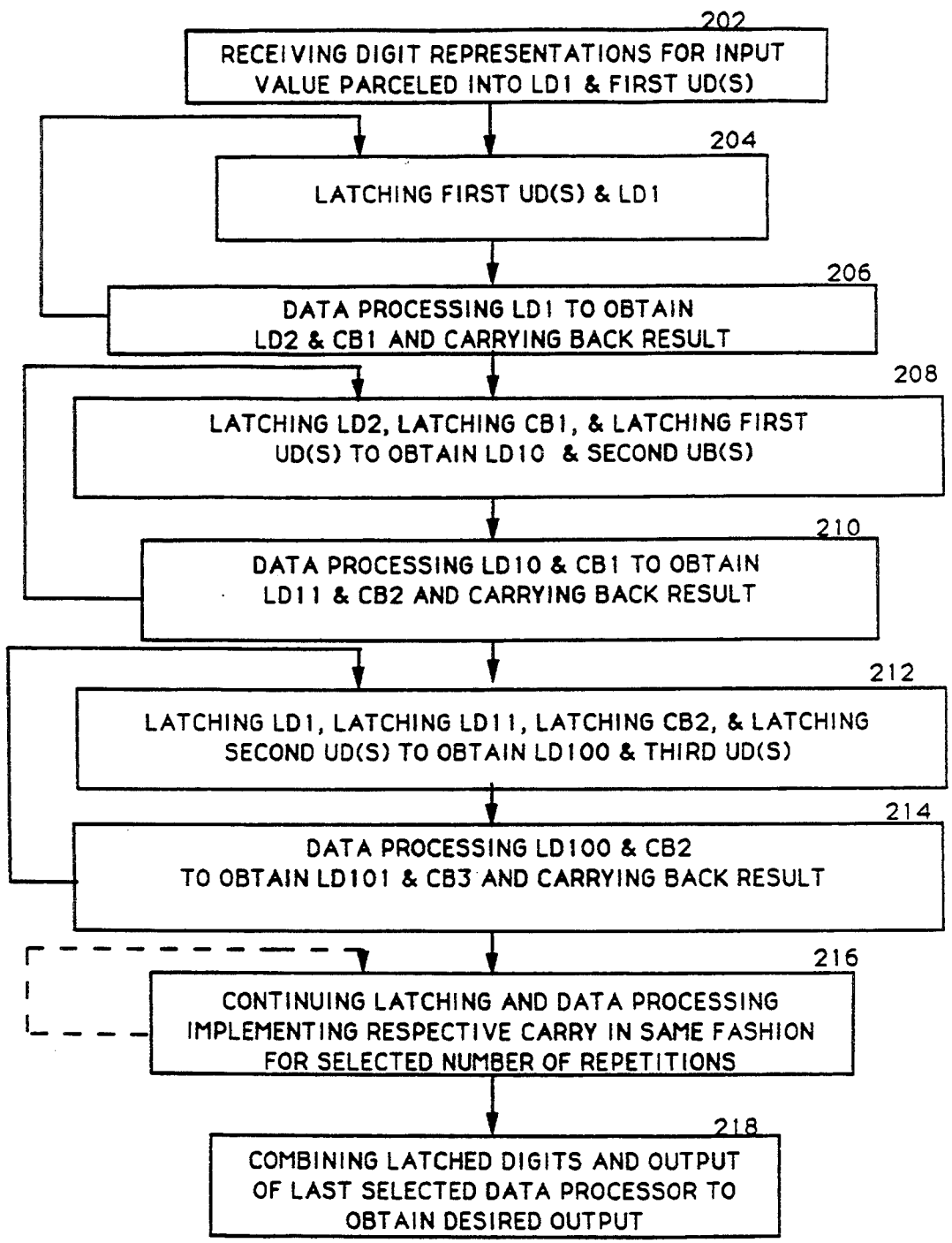
FIG. 2 is a flow diagram of a method utilized by a data processing apparatus in accordance with the present invention.

FIG. 2, 200, sets forth a flow diagram of a method utilized by a data processing apparatus in accordance with the present invention. The present invention utilizes a method of performing a carry look-ahead cumulative data processing operation. An input value is utilized such that the input value is parceled into consecutive preselected digit lengths comprising a first lowest digit length LD1 and first upper digit length(s) UD(S)(202). The first upper digit length(s)( FIRST UD(S)) and lowest digit length (LD1) of the consecutive preselected digit lengths are latched in parallel in selected pre-stage latches (204). The first lowest digit length LD1 is data processed, typically by addition, to obtain a processed first lowest digit length LD2 and a first carry CB1, and to feed back the processed first lowest digit length to a selected pre-stage latch, respective parallel digit length(s) being latched to provide data flow (206). Latching the processed first lowest digit length LD2, latching the first carry CB1, and latching the upper digit length(s) provides a second lowest digit length LD10 and next respective upper digit length(s) (SECOND UD(S))(208). Respective parallel digit length(s), here LD2, are latched in each step simultaneously to provide data flow (214).

The second lowest digit length LD10 is data processed, typically by addition, to provide a processed second lowest digit length LD11 and a second carry CB2, and to feed back the processed second lowest digit length to a selected pre-stage latch, respective parallel digit length(s) being latched to provide data flow (210). Latching of the processed second lowest digit length LD11, latching the second carry CB2, and latching the second upper digit length(s) provide a third lowest digit length LD100 and third respective upper digit length(s) (THIRD UD(S))(212).

The third lowest digit length LD100 is data processed to provide a processed third lowest digit length LD101 and a third carry CB3, and to feed back the processed third lowest digit length to a selected pre-stage latch, respective parallel digit length(s) being latched to provide data flow (214).

Latching and data processing are continued, implementing respective carry in the fashion described above, for a selected number of repetitions (216). Then latch outputs are combined to obtain a desired output (218).

Clearly, while binary input data format is described above, format is selectable. Also, as set forth for the data processing apparatus, the method of the present invention utilizes clock pulse initiation of data processing and latching.

For example, referring to FIG. 1, assume M=1 and a total number of bits available is N=3; i.e., A and B are 3-bit operands. Thus, the first DP (108) is a 1-bit half-adder, and the second DP (120) and the third DP (128) are 1-bit full adders. Each line for data flow in the FIG. 1 is equivalent then to 1 bit. Operand A presented at each clock cycle (time slice) is represented in the following discussion with its representative letter and the time slice at which presented; i.e., A1 is an operand presented at a first clock cycle, A2 is an operand presented at a second clock cycle, and so on. Due to pipelining, a first result R1=A1 is not available until a third clock cycle, a second result R2=A1+A2 is not available until a fourth clock cycle, and a third result R3=A1+A2+A3 is not available until a fifth clock cycle. Carry out is normally ignored in an integration operation in order to maintain consistency of overflow operation. Individual bits of operands and results are represented by a bit number following the operand or result; therefore, A2(0) is a least significant bit of a second A operand, and R1(2) is a most significant bit of the first result. Note that the carry output of a result is normally ignored for integration. All outputs described represent a stable result at the end of the time slice.

For the purposes of this example, the following values for operands will be used:

A1=2 (binary 010)
A2=3 (binary 011)
A3=5 (binary 101)

Implementation of these operands provides a normal overflow of a result, with an expected sum of 10 (binary 1010) limited to three bits, and thereby overflowing to 2 (binary 010).

The following tables show outputs of latches and adders in each time slice as the above operands are sequentially applied to the apparatus of the present invention. For simplicity, the latches are assumed to be initialized to zero before the first clock cycle, and all operands successive to the third time slice are assumed to be zero. Different stages of the pipeline are staggered for clarity; the time slices are delineated by vertical lines.

| Time slice:         | 1 | 2 | 3 | 4 | 5 |
|---------------------|---|---|---|---|---|
| Latch 106           | 0 | 0 | 1 | 0 | 0 |
| Latch 104           | 1 | 1 | 0 | 0 | 0 |
| Latch 102           | 0 | 1 | 1 | 0 | 0 |
| Latch 103           | 0 | 0 | 1 | 0 | 0 |
| Adder 108 (carry out) | 0 | 0 | 1 | 0 | 0 |
| Adder 108 (sum)     | 0 | 1 | 0 | 0 | 0 |
| Latch 112           | 0 | 0 | 0 | 1 | 0 |
| Latch 110           | 0 | 1 | 1 | 0 | 0 |
| Latch 105           | 0 | 0 | 1 | 0 | 0 |
| Latch 116           | 0 | 0 | 0 | 1 | 0 |
| Adder 120 (carry out) | 0 | 0 | 1 | 0 | 0 |
| Adder 120 (sum)     | 0 | 1 | 0 | 1 | 0 |
| Latch 114           | 0 | 0 | 1 | 0 | 0 |
| Latch 118           | 0 | 0 | 0 | 0 | 1 |
| Latch 107           | 0 | 0 | 0 | 0 | 0 |
| Latch 126           | 0 | 0 | 0 | 1 | 0 |
| Adder 128 (carry out) | 0 | 0 | 0 | 0 | 1 |
| Adder 128 (sum)     | 0 | 0 | 0 | 1 | 0 |
| Latch 124           | 0 | 0 | 1 | 0 | 1 |
| Latch 122           | 0 | 0 | 0 | 1 | 0 |

The lower three bits in the table represent a result in descending order of magnitude. Therefore, R1 (seen in time slice 3) is binary 010, or 2, R2 (seen in time slice 4) is binary 101, or 5, and R3 (seen in time slice 5) is binary 010, or 2. These are the results from the given operands.

I claim:

1. A data processing apparatus for processing input data, comprising at least:

a predetermined integral number Q of row groupings of elements, each row grouping of elements containing a data processor and a predetermined number of latches L, and wherein input data and outputs of each of the data processors and latches are transferred to a next-coupled element in a strobe manner upon operation of a predetermined clock signal from a clock that is operably coupled to every element, wherein, the row groupings of elements include:

for the first row: a first special grouping operably coupled to receive input data and serially coupled to a first latch, of a remaining serially coupled L−2 latches of the first row, for each of a remaining Q−1 rows: Q−1 serially coupled latches operably coupled to a second special grouping that is operably coupled to the first latch of a remaining serially coupled L−(Q−2) latches of each row, wherein the first special grouping comprises:

a first latch, operably coupled to receive a first M bits of the input data, M an integer, and another latch, operably coupled to receive a first output from a first data processor, and the first data processor, operably coupled to receive an output from each of the latches of the first special grouping, for determining a first sum and a first carry, for providing the first carry to a latch of a second row wherein said second row latch is coupled to a second data processor of a second special grouping of a second row of elements and for providing the first sum to a first latch, of the remaining L−2 latches in the first row, wherein the second special grouping comprises:

Q−1 serially coupled latches, further including a first latch, of the Q−1 latches, that is operably coupled to receive a subsequent M bits of the input data, M an integer, and another latch, operably coupled to receive an output from a second data processor, and the second data processor, operably coupled to receive an output from the first latch of the Q−1 latches and another latch that is operably coupled to receive an output from the second data processor, for determining a second sum and a second carry, and providing the second carry to a next row latch wherein said next row latch is coupled to a next row data processor of the second special grouping of the next row of elements and providing the second sum to a first latch, of the remaining serially coupled L(Q−1) latches of a row, combining means operably coupled to each of a last latch of each row for determining an output for a cumulative data processing operation, and wherein:

latches coupled prior to data processors are termed pre-stage latching means and latches coupled after data processors are termed post-stage latching means.

2. The data processing apparatus of claim 1, wherein the first and second data processors provide a processing operation that is one of: addition and subtraction, and the cumulative data processing operation is one of: integration and differentiation.

3. The data processing apparatus of claim 1, wherein at least selected pre-stage latching means receive the input data in consecutive preselected digit lengths.

4. The data processing apparatus of claim 3, wherein the input data is in a binary format.

5. The data processing apparatus of claim 1, wherein the data processors, a first latching means, a second latching means, and a third latching means are activated by a clock signal.

6. A data processing apparatus for processing binary input data, processing comprising one of: integrating and differentiating, comprising at least:

a predetermined integral number Q of row groupings of elements, each row grouping of elements containing a data processor and a predetermined number of latches L, and wherein input data and outputs of each data processor and each latches are transferred to a next-coupled element in a strobe manner upon operation of a predetermined clock signal from a clock that is operably coupled to every element, wherein the first row grouping of elements comprises:

a first latch, operably coupled to receive a first M bits of the input data, M an integer, and another latch, operably coupled to receive a first output from a first data processor, and the first data processor, operably coupled to receive an output from each of the latches of a first special grouping, for determining a first sum and a first carry, for providing the first carry to a latch of the second row wherein said second row latch is coupled to a second data processor of a second special grouping of a second row of elements and for providing the first sum to a first latch, of a remaining L−2 latches in the first row, and the remaining L−2 latches in the first row, wherein each of the remaining row groupings of elements each comprise:

Q−1 serially coupled latches, further comprising a first latch, of the Q−1 latches, operably coupled to receive a subsequent M bits of the input data, M an integer, and another latch, operably coupled to receive an output from a second data processor, and the second data processor, operably coupled to receive an output from the first latch of Q−1 latches and the other latch that is operably coupled to receive an output from the second data processor, for determining a second sum and a second carry, and providing the second carry to a next row latch wherein said next row latch is coupled to a next row data processor of the second special grouping of the next row of elements and providing the second sum to a first latch, of a remaining serially coupled L−(Q−1) latches of the row, and the remaining serially coupled L−(Q−1) latches of the row, and combining means operably coupled to each of a last latch of each row for determining an output for a cumulative data processing operation, and wherein:

latches coupled prior to data processors are termed pre-stage latching means and latches coupled after data processors are termed post-stage latching means.

7. The data processing apparatus of claim 6, wherein at least selected pre-stage latching means receive the input data in consecutive preselected digit lengths.

8. The data processing apparatus of claim 6, wherein the data processors, a first latching means, a second latching means, and a third latching means are activated by a clock signal.

9. The data processing apparatus of claim 6, wherein the data processors utilize one of: addition and subtraction and the cumulative data processing operation is one of: integration and differentiation.

* * * * *

UNITED STATES PATENT AND TRADEMARK OFFICE
CERTIFICATE OF CORRECTION

PATENT NO. : 5,367,691

DATED : November 22, 1994

INVENTOR(S) : Mark J. Johnson

It is certified that error appears in the above-identified patent and that said Letters Patent is hereby corrected as shown below:

At column 6, line 48, "L-(Q-2)" should be --L-(Q+2)--.

At column 7, line 14, "L(Q-1)" should be --L-(Q+2)--.

At column 7, line 47, "each latches" should be --each latch--.

At column 8, line 32, "L-(Q-1)" should be --L-(Q+2)--.

At column 8, line 34, "L-(Q-1)" should be --L-(Q+2)--.

Signed and Sealed this

Thirty-first Day of January, 1995

Attest:

BRUCE LEHMAN

Attesting Officer     Commissioner of Patents and Trademarks